(12) United States Patent
Liu et al.

(10) Patent No.: US 11,359,065 B2
(45) Date of Patent: Jun. 14, 2022

(54) METHOD FOR DIRECT FLUORINATION OF PLASTICS AND ARTICLES MADE THEREOF

(71) Applicant: Inhance Technologies, LLC, Houston, TX (US)

(72) Inventors: Zhenshuo Liu, Missour City, TX (US); Subramanian Iyer, Katy, TX (US)

(73) Assignee: Inhance Technologies, LLC, Houston, TX (US)

( * ) Notice: Subject to any disclaimer, the term of this patent is extended or adjusted under 35 U.S.C. 154(b) by 0 days.

(21) Appl. No.: 17/225,496

(22) Filed: Apr. 8, 2021

(65) Prior Publication Data

US 2021/0332207 A1    Oct. 28, 2021

Related U.S. Application Data

(60) Provisional application No. 63/015,829, filed on Apr. 27, 2020.

(51) Int. Cl.
| | | |
|---|---|---|
| *C08J 7/00* | (2006.01) | |
| *C08J 7/12* | (2006.01) | |
| *C08F 8/22* | (2006.01) | |

(52) U.S. Cl.
CPC ............... *C08J 7/126* (2013.01); *C08F 8/22* (2013.01); *C08J 2323/06* (2013.01)

(58) Field of Classification Search
CPC .... C08J 7/126; C08J 2323/06; C08J 2323/08; C08J 2323/04; C08J 2323/10; C08J 2323/12; C08J 2323/14
See application file for complete search history.

(56) References Cited

U.S. PATENT DOCUMENTS

| | | | | |
|---|---|---|---|---|
| 2,811,468 A | * | 10/1957 | Joffre | ............ C08F 8/20 428/35.7 |
| 4,869,859 A | * | 9/1989 | Eschwey | ......... B29C 49/46 264/83 |
| 5,770,135 A | * | 6/1998 | Hobbs | ............ B29C 49/46 264/83 |

OTHER PUBLICATIONS

Test Procedure to Measure the Fuel Permeability of Materials by the Cup Weight Loss Method, Surface Vehicle Recommended Practice, SAE International (Oct. 2006). Can be retrieved from the interntet at <https://www.sae.org/standards/content/j2665_200610/>.

\* cited by examiner

*Primary Examiner* — Robert C Boyle
(74) *Attorney, Agent, or Firm* — Clements Bernard Walker; Jennifer R. Knight

(57) ABSTRACT

A method for the direct fluorination of plastics and articles made from plastics is presented. The novel method includes ensuring extremely low oxygen and moisture content in the chamber before the primary fluorination step, ramping the fluorine concentration during the fluorination step, and providing a quenching step for improved shelf-life. Containers processed by the novel method demonstrate a marked improvement in barrier properties for organic solutions.

16 Claims, 2 Drawing Sheets

METHOD FOR DIRECT FLUORINATION OF PLASTICS AND ARTICLES MADE THEREOF

CROSS-REFERENCE

This application claims priority under 35 U.S.C. 119(e) to U.S. Provisional Application Ser. No. 63/015,829 filed on Apr. 27, 2020, which is incorporated herein by reference in its entirety.

FIELD

The invention relates to the fluorination of plastic containers for improved organic solution barrier properties and the plastic containers with improved organic solution barrier properties.

BACKGROUND

Plastics are used in many applications today because of their many advantages including cost, weight, and shatter resistance. While many conventional plastics provide sufficient barrier properties for water and other aqueous solutions, many do not have sufficient barrier properties for organic solutions. As such, conventional plastics are not suitable for many formulations that contain solvents, flavors, fragrances, organic active ingredients, and fuel mixtures. Organic contents often permeate through untreated plastic container walls, leading to loss of product or product efficacy, spoilage, and emission problems.

Fluorine treatment of conventional plastics, such as high density polyethylene (HDPE), has been used to improve the barrier properties of plastics to organic solutions. Advantages include flexible treatment applied post manufacture of plastic articles of many shapes and sizes. Fluorine treatment permanently changes the surface of the plastic, converting conventional plastics into high performance materials. The treatment enables permanent and durable barrier properties on both sides of a container while maintaining the recyclability of the plastic as the overall composition of the container is virtually unchanged.

Current commercial, post-mold fluorination technology improves, but does not eliminate leakage of organic solutions from treated plastic containers. There is a need, based upon ever more stringent regulations and the desire to accommodate a wider range of organic solutions, to improve the barrier properties imparted by fluorination. There is a need to improve barrier properties with minimal impact of processing time (i.e., production efficiency) and hardware.

SUMMARY

According to an exemplary embodiment of the invention, a method of direct fluorination of a plastic container is provided. The method comprises, (a) providing a plastic container in a chamber, (b) providing an anaerobic and low moisture environment in the chamber, (c) providing at least one primary fluorination step of the plastic container to produce a fluorinated plastic container, and (d) providing a quenching step to the fluorinated plastic container to produce an ultra-barrier plastic container.

According to another exemplary embodiment of the invention, a method of direct fluorination of a plastic fuel tank is provided. The method comprises, (a) providing a plastic fuel tank in a chamber, (b) providing an anaerobic and low moisture environment in the chamber, (c) providing at least one primary fluorination step of the plastic fuel tank to produce a fluorinated plastic fuel tank, and (d) providing a quenching step to the fluorinated plastic fuel tank to produce an ultra-barrier plastic fuel tank.

According to yet another exemplary embodiment of the invention, an ultra-barrier plastic container produced by direct fluorination of a plastic container is provided. The direct fluorination of the plastic container comprises (a) providing a plastic container in a chamber, (b) providing an anaerobic and low moisture environment in the chamber, (c) providing at least one primary fluorination step of the plastic container to produce a fluorinated plastic container, and (d) providing a quenching step to the fluorinated plastic container to produce an ultra-barrier plastic container.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures.

DETAILED DESCRIPTION

Figure 1:
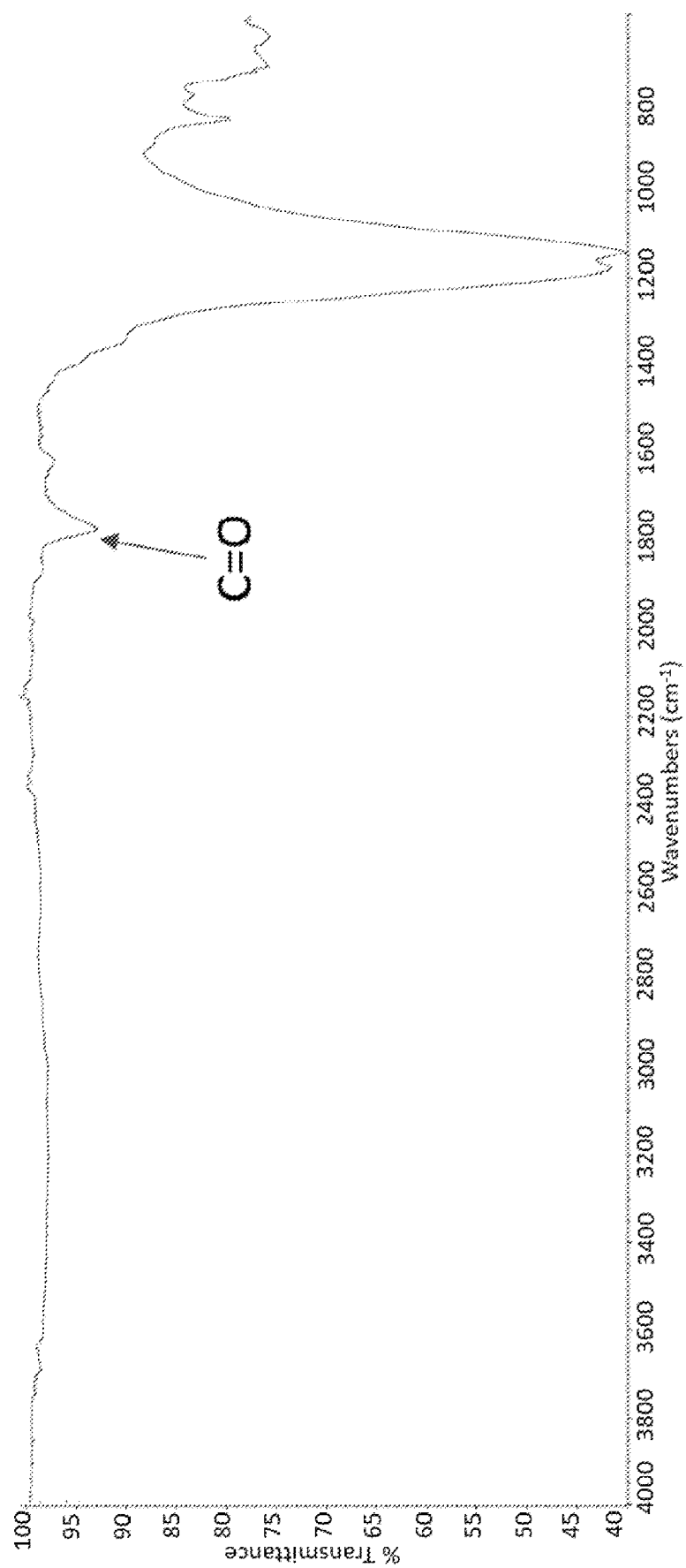
FIG. 1 represents the Fourier Transform Infrared Spectroscopy (FTIR) graph for Comparative Example 1.

The present invention provides in an exemplary embodiment, a method of direct fluorination of a plastic container. The method comprises, (a) providing a plastic container in a chamber, (b) providing an anaerobic and low moisture environment in the chamber, (c) providing at least one primary fluorination step of the plastic container to produce a fluorinated plastic container, and (d) providing a quenching step to the fluorinated plastic container to produce an ultra-barrier plastic container.

It is to be understood that the mention of one or more method steps does not preclude the presence of additional method steps before or after the combined recited steps or intervening method steps between those steps expressly identified. Moreover, the lettering of method steps or ingredients is a conventional means for identifying discrete activities or ingredients and the recited lettering can be arranged in any sequence, unless otherwise indicated. Method steps that begin with the word "optionally" may occur, but are not required to occur.

As used herein, the term "and/or", when used in a list of two or more items, means that any one of the listed items can be employed by itself, or any combination or two or more of the listed items can be employed. For example, if a composition is described as containing compounds A, B, "and/or" C, the composition may contain A alone; B alone; C alone; A and B in combination; A and C in combination; B and C in combination; or A, B, and C in combination.

As used herein, the term "plastic container", refers to a plastic receptacle or enclosure for retaining a liquid. The size is not particularly limited as long as the "plastic container" can fit inside the chamber. Non-limiting examples of uses for plastic containers include cosmetic packaging, household cleaning packaging, industrial solvent packaging, and fuel tanks.

As used herein, the term "plastic fuel tank" refers to a plastic container for holding liquid fuel. Fuel is intended to be broadly interpreted as any liquid that can be made to react with other substances so that it releases energy as heat energy to be used for work.

As used herein, the term "chamber", refers to at least one piece of process equipment capable of enclosing the plastic container and the fluorination gas and excluding atmospheric gases at the process conditions.

As used herein, the term "anaerobic environment", refers to an environment wherein free oxygen is substantially absent. For the purposes of the present invention, where free oxygen competes with the desired reactions, an "anaerobic environment" comprises less than 100 ppm free oxygen unless a smaller amount of free oxygen is specified.

As used herein, the term "low moisture environment", refers to an environment wherein $H_2O$ is substantially absent. For the purposes of the present invention, a "low moisture environment" comprises less than 100 ppm of $H_2O$ unless a smaller amount of $H_2O$ is specified.

As used herein, the term "pulling vacuum to an absolute pressure less than z", such as "pulling vacuum to an absolute pressure less than 10 torr", refers to pulling vacuum on the chamber to remove gas from the chamber and continuing to pull vacuum until the absolute pressure is less than the limit, e.g., less than z or less than 10 torr.

As used herein, the term "feeding substance A to the chamber to an absolute pressure value ranging from X to Y", such as "feeding nitrogen to the chamber to an absolute pressure value ranging from 100 torr to 500 torr", refers to feeding a substance to the chamber until the pressure reaches a value within the given range. Once the value is reached, the feeding may stop or may be balanced with an outflow of the substance to maintain the pressure at the value. As used herein, the term "feeding substance A to the chamber to a partial pressure from X to Y", such as "feeding a fluorination gas to the chamber to a final fluorine partial pressure ranging from 5 torr to 20 torr", refers to feeding a substance to the chamber until the indicated partial pressure reaches a value within the given range. Once the partial pressure value is reached, the feeding may stop or may be balanced with an outflow of the substance to maintain the partial pressure at the value.

As used herein, the term "fluorination gas" refers to a gas comprising fluorine, chlorine trifluoride, and/or nitrogen trifluoride. The "fluorination gas" may also contain inert elements and/or compounds.

As used herein, the term "returning the chamber to atmospheric conditions" refers to opening the chamber such that the gas within the chamber is in equilibrium with the gas outside the chamber.

As used herein, the term "scavenger" refers to chemical substances added to the chamber to terminate free radicals.

As used herein, the term "substantially similar barrier plastic container" refers to a plastic container of equivalent size and shape that has been fabricated to hold organic solutions. In order to have equivalent size and shape, in addition to looking similar, each container has a capacity for holding a liquid within 5% of the other and each container has a surface area each within 5% of the other. The "substantially similar barrier plastic container" is not required to be made of the same plastic as the plastic container to which it is being compared; however, the plastic in the "substantially similar barrier plastic container" should not be substantially more costly (e.g., over 10 percent more costly) than the plastic of the plastic container.

As used herein, the term "organic solution" refers to any liquid comprising organic molecules. An "organic solution" may or may not contain aqueous and/or other inorganic components.

As used herein, the term "plastic fuel tank is fluidly connectable to" refers to the capability of the plastic fuel tank to be connected to a machine (e.g., a mower, a car, etc.) whereby the fuel is in fluid connection with the machine such that the fuel's energy may be used to power the machine.

The present invention provides in an exemplary embodiment, a method of direct fluorination of a plastic container. Method step (a) is providing a plastic container in a chamber. The plastic container is not particularly limited. In some aspects, the plastic container comprises polyethylene, polypropylene, thermosets and/or copolymers thereof. In some aspects, the plastic container comprises a polymer selected from the group consisting of polyethylene (PE), polypropylene (PP), and/or cross-linked polyethylene (XLPE). In some aspects, the plastic container comprises a polymer selected from the group consisting of high density polyethylene (HDPE), polypropylene (PP), low density polyethylene (LDPE), and/or cross-linked polyethylene (XLPE). In some aspects, the plastic container comprises polymers selected from the group consisting of HDPE and XLPE.

Method step (b) is providing an anaerobic and low moisture environment in the chamber. In one aspect, the anaerobic environment in the chamber comprises less than 100 ppm of free oxygen. Other examples of the amount of free oxygen include less than 50 ppm, less than 10 ppm, and less than 1 ppm of free oxygen. In some aspects, providing an anaerobic environment comprises one or more sequences of filling the chamber with nitrogen followed by pulling vacuum. In one aspect, the low moisture environment in the chamber comprises less than 100 ppm of $H_2O$. Other examples of the amount of $H_2O$ include less than 50 ppm, less than 10 ppm, and less than 1 ppm of $H_2O$. In some aspects providing a low moisture environment comprises the steps taken to provide an anaerobic environment as well as providing a small amount of fluorination gas to react with any remaining $H_2O$ in the chamber.

In some aspects, step (b) comprises the following steps: (b)(I) pulling vacuum on the chamber to an absolute pressure less than 10 torr; (b)(II) feeding nitrogen to the chamber to an absolute pressure ranging from 100 torr to 500 torr followed by pulling vacuum on the chamber to an absolute pressure less than 10 torr; (b)(III) optionally repeating steps (b)(I) and (b)(II) at least once; (b)(IV) feeding a first fluorination gas to the chamber to a fluorine partial pressure ranging from 5 torr to 20 torr; (b)(V) ceasing any inflow and/or outflow from the chamber for a time ranging from 0 minutes to 20 minutes; and (b)(VI) pulling vacuum on the chamber to an absolute pressure less than 10 torr. In some aspects, steps (b)(I) and (b)(II) are repeated at least once. In some aspects steps (b)(I) and (b)(II) are is repeated 1 to 6 times. In some aspects, step (b) further comprises step (b)(VII), feeding nitrogen to the chamber to an absolute pressure ranging from 100 torr to 500 torr followed by pulling vacuum on the chamber to an absolute pressure less than 10 torr. In some aspects, step (b)(VII) is repeated at least once. In some aspects step (b)(VII) is repeated 0 to 6 times.

Method step (c) is providing at least one primary fluorination step of the plastic container to produce a fluorinated plastic container. In some aspects, step (c) comprises the following steps: (c)(I) feeding a second fluorination gas to the chamber at a rate whereby a fluorine partial pressure increases in a range from 0.5 torr/min to 5.0 torr/min providing a final fluorine partial pressure ranging from 20 torr to 200 torr; (c)(II) exposing the plastic container to the second fluorination gas at the (c)(II) final fluorine partial pressure for a time of at least 30 minutes; (c)(III) pulling vacuum on the chamber to an absolute pressure less than 10 torr; (c)(IV) repeating steps (c)(I) to (c)(III) 0 to 3 times. In some aspects, step (c) further comprises step (c)(V) feeding nitrogen to the chamber to an absolute pressure ranging from 100 torr to 500 torr followed by pulling vacuum on the chamber to an absolute pressure less than 10 torr. In some aspects, step (c)(V) is repeated at least once. In some aspects step (c)(V) is repeated 0 to 6 times.

In the above-described aspect of step (c) the second fluorination gas is fed to the chamber at a controlled rate and continues to be fed to the chamber until the final partial pressure of fluorine is reached within the stated range. Once the final partial pressure is achieved, the fluorination gas can be turned off or a corresponding outlet from the chamber can be used to maintain the final fluorine partial pressure.

In other non-limiting examples, during step (c)(I) the fluorine partial pressure increases in a range from 0.5 torr/min to 3.0 torr/min or from 1.0 torr/min to 2.5 torr/min. Other non-limiting examples of the final fluorine partial pressure ranges of step (c)(I) are from 20 torr to 150 torr, from 20 torr to 100 torr, from 20 torr to 80 torr, from 30 torr to 200 torr, from 30 torr to 150 torr, from 30 torr to 100 torr, or from 30 torr to 80 torr. In other non-limiting examples, the step (c)(II) exposing time ranges from 30 minutes to 600 minutes, 30 minutes to 500 minutes, 30 minutes to 300 minutes, 30 minutes to 200 minutes, or from 30 minutes to 150 minutes.

Method step (d) is providing a quenching step. In some aspects, the quenching step (d) comprises (d)(I) optionally, a scavenging step; (d)(II) returning the chamber to atmospheric conditions and exposing the plastic container to the atmosphere for a time period of at least 2 hours; and (d)(III) optionally, a fluorination finishing step. At least one of the optional steps, (d)(I) and (d)(III) occur. If (d)(I) and (d)(III) both occur, the fluorinated plastic container is exposed to a scavenger to produce a scavenged plastic container and the scavenged plastic container is exposed to a fluorination gas to produce the ultra-barrier plastic container. If (d)(I) occurs and (d)(III) does not, then the ultra-barrier plastic container is the scavenged plastic container. If (d)(I) does not occur and (d)(III) does occur, then the fluorinated plastic container is further exposed to a fluorination gas to produce the ultra-barrier plastic container.

In some aspects, the optional scavenging step (d)(I) of method step (d) comprises the following steps: (d)(I)(i) feeding a scavenger to the chamber to a final scavenger partial pressure of at least 5 torr; (d)(I)(ii) exposing the fluorinated plastic container to the scavenger at the (d)(I)(i) final scavenger partial pressure for a time of at least 5 minutes to produce a scavenged plastic container; (d)(I)(iii) feeding nitrogen to the chamber to an absolute pressure ranging from 100 torr to 500 torr followed by pulling vacuum on the chamber to an absolute pressure less than 10 torr; and (d)(I)(iv) repeating step (d)(I)(iii) 1 to 6 times. In some aspects, the scavenger is selected from the group consisting of nitric oxide and triethyl amine. In some aspects, the step (d)(I)(i) final scavenger partial pressure ranges from 5 torr to 50 torr or from 5 torr to 30 torr. In some aspects, the step (d)(I)(ii) exposing time ranges from 5 minutes to 60 minutes or 5 minutes to 30 minutes. In some aspects, the step (d)(I)(i) final scavenger partial pressure ranges from 5 torr to 50 torr and the step (d)(I)(ii) exposing time ranges from 5 minutes to 60 minutes.

In some aspects, the optional fluorination finishing step (d)(III) of method step (d) comprises the following steps: (d)(III)(i) ensuring the fluorinated plastic container or the scavenged plastic container is in the chamber and pulling vacuum on the chamber to an absolute pressure less than 10 torr; (d)(III)(ii) feeding nitrogen to the chamber to an absolute pressure ranging from 100 torr to 500 torr followed by pulling vacuum on the chamber to an absolute pressure less than 10 torr; (d)(III)(iii) repeating step (d)(III)(ii) at least once; (d)(III)(iv) feeding a third fluorination gas to the chamber to a final fluorine partial pressure of at least 10 torr; (d)(III)(v) exposing the fluorinated plastic container or the scavenged plastic container to the third fluorination gas at the (d)(III)(iv) final fluorine partial pressure for a time of at least 5 minutes to produce an ultra-barrier plastic container; (d)(III)(vi) feeding nitrogen to the chamber to an absolute pressure ranging from 100 torr to 500 torr followed by pulling vacuum on the chamber to an absolute pressure less than 10 torr; and (d)(III)(vii) repeating step (d)(III)(vi) 1 to 6 times. In some aspects, the step (d)(III)(iv) final fluorine partial pressure ranges from 10 torr to 50 torr or from 10 torr to 30 torr. In some aspects, the step (d)(III)(v) exposing time ranges from 5 minutes to 60 minutes or 5 minutes to 30 minutes.

In some aspects the step (d)(II) time period ranges from 2 hours to 120 hours and step (d)(III) occurs. In some aspects, the step (d)(III)(iv) final fluorine partial pressure ranges from 10 torr to 50 torr and the step (d)(III)(v) exposing time ranges from 5 minutes to 30 minutes.

A fluorination gas is fed to the chamber in step (b) the providing an anaerobic and low moisture environment in the chamber, in step (c) the providing at least one primary fluorination step, and optionally in step (d) the providing the quenching step. In some aspects, a first fluorination gas is fed in step (b); a second fluorination gas is fed in step (c); and optionally, a third fluorination gas is fed in step (d). In some aspects, the first, second, and third fluorination gases have the same composition. In some aspects, one or more of the first, second and/or third fluorination gases have different composition. In some aspects the first, second, and/or third fluorination gas comprises fluorine. In some aspects the fluorination gas comprises an inert gas such as nitrogen. Non-limiting examples of the fluorination gas include a fluorination gas comprising from 1 vol % to 100 vol % fluorine, or from 5 vol % to 100 vol % or from 10 vol % to 100 vol % fluorine.

The present embodiment improves the barrier properties of the plastic container to organic solutions. In some aspects, a first steady-state weight loss of an organic solution from the ultra-barrier container is less than 60 percent of a second steady-state weight loss of the organic solution from a substantially similar barrier plastic container, as measured using ASTMD2684-10 at 50° C. In some aspects, the first steady-state weight loss is less than 55 percent, less than 50 weight percent, less than 45 weight percent, less than 40 weight percent, or less than 35 weight percent of the second steady-state weight loss.

In some aspects, the organic solution comprises agricultural chemicals, fuel, fuel additives, cleaners, degreasers, solvents, acetone, d-limonene, terpenes, fragrances, and/or essential oils. In some aspects, the organic solution is selected from the group consisting of 1,1,1-trichloroethane, xylene, heavy gasoline, naphtha, toluene, mineral spirits, carbon tetrachloride, and turpentine.

In some aspects a standard 32 oz f-style plastic HDPE bottle subject to steps (a) through (d) loses less than 1.4 gm/m²/day of toluene after being filled with the toluene and subjected to a temperature of no lower than 50° C. for 28 days. In some aspects, the standard 32 oz f-style plastic HDPE bottle subject to steps (a) through (d) loses less than 1.3 gm/m²/day, less than 1.2 gm/m²/day, less than 1.1 gm/m²/day, less than 1.0 gm/m²/day, or less than 0.9 gm/m²/day.

According to another exemplary embodiment of the invention, a method of direct fluorination of a plastic fuel tank is provided. The method comprises, (a) providing a plastic fuel tank in a chamber, (b) providing an anaerobic and low moisture environment in the chamber, (c) providing at least one primary fluorination step of the plastic fuel tank to produce a fluorinated plastic fuel tank, and (d) providing a quenching step to the fluorinated plastic fuel tank to produce an ultra-barrier plastic fuel tank.

It is to be understood that the anaerobic and low moisture environment in the chamber, the at least one primary fluorination step of the plastic container to produce a fluorinated plastic container, and the quenching step to produce an ultra-barrier plastic container, the fluorination gas, the scavenging step, the fluorination finishing step, the measures of improvement in barrier properties imparted to the ultra-barrier containers described herein above apply to the present embodiment as well.

The present invention provides in an exemplary embodiment, a method of direct fluorination of a plastic fuel tank. Method step (a) is providing a plastic fuel tank in a chamber. The plastic fuel tank is not particularly limited. In some aspects, the plastic fuel tank comprises polyethylene, polypropylene, thermosets and/or copolymers thereof. In some aspects, the plastic fuel tank comprises a polymer selected from the group consisting of polyethylene (PE), polypropylene (PP), and/or cross-linked polyethylene (XLPE). In some aspects, the plastic fuel tank comprises a polymer selected from the group consisting of high density polyethylene (HDPE), polypropylene (PP), low density polyethylene (LDPE), and/or cross-linked polyethylene (XLPE). In some aspects, the plastic fuel tank comprises polymers selected from the group consisting of HDPE and XLPE Method step (b) is providing an anaerobic and low moisture environment in the chamber and method step (c) is providing at least one primary fluorination step of the plastic fuel tank to produce a fluorinated plastic fuel tank. In some aspects, step (b) comprises the following steps: (b)(I) pulling vacuum on the chamber to an absolute pressure less than 10 torr; (b)(II) feeding nitrogen to the chamber to an absolute pressure ranging from 100 torr to 500 torr followed by pulling vacuum on the chamber to an absolute pressure less than 10 torr; (b)(III) optionally repeating steps (b)(I) and (b)(II) at least once; (b)(IV) feeding a first fluorination gas to the chamber to a final fluorine partial pressure ranging from 5 torr to 20 torr; (b)(V) ceasing any inflow and/or outflow from the chamber for a time ranging from 0 minutes to 20 minutes; and (b)(VI) pulling vacuum on the chamber to an absolute pressure less than 10 torr. In some aspects, steps (b)(I) and (b)(II) are repeated at least once. In some aspects steps (b)(I) and (b)(II) are repeated 1 to 6 times. In some aspects, step (b) further comprises step (b)(VII), feeding nitrogen to the chamber to an absolute pressure ranging from 100 torr to 500 torr followed by pulling vacuum on the chamber to an absolute pressure less than 10 torr. In some aspects, step (b)(VII) is repeated at least once. In some aspects step (b)(VII) is repeated 0 to 6 times.

In some aspects, step (c) comprises the following steps: (c)(I) feeding a second fluorination gas to the chamber at a rate whereby a fluorine partial pressure increases in a range from 0.5 torr/min to 5.0 torr/min providing a final fluorine partial pressure ranging from 20 torr to 200 torr; (c)(II) exposing the plastic fuel tank to the second fluorination gas at the (c)(I) final fluorine partial pressure for a time of at least 30 minutes; (c)(III) pulling vacuum on the chamber to an absolute pressure less than 10 torr; (c)(IV) repeating steps (c)(I) to (c)(III) 0 to 3 times. In some aspects, step (c) further comprises step (c)(V) feeding nitrogen to the chamber to an absolute pressure ranging from 100 torr to 500 torr followed by pulling vacuum on the chamber to an absolute pressure less than 10 torr. In some aspects, step (c)(V) is repeated at least once. In some aspects step (c)(V) is repeated 0 to 6 times.

In other non-limiting examples, during step (c)(I) the fluorine partial pressure increases in a range from 0.5 torr/min to 3.0 torr/min or from 1.0 torr/min to 2.5 torr/min. Other non-limiting examples of the step (c)(I) final fluorine partial pressure ranges are from 20 torr to 150 torr, from 20 torr to 100 torr, from 20 torr to 80 torr, from 30 torr to 200 torr, from 30 torr to 150 torr, from 30 torr to 100 torr, or from 30 torr to 80 torr. In other non-limiting examples, the exposing step (c)(II) lasts for the time range from 30 minutes to 600 minutes, 30 minutes to 500 minutes, 30 minutes to 300 minutes, 30 minutes to 200 minutes, or from 30 minutes to 150 minutes.

In some aspects, the quenching step (d) comprises (d)(I) optionally, a scavenging step; (d)(II) returning the chamber to atmospheric conditions and exposing the plastic fuel tank to the atmosphere for a time period of at least 2 hours; and (d)(III) optionally, a fluorination finishing step. At least one of the optional steps, (d)(I) and d(III) occur. If (d)(I) and (d)(III) both occur, the fluorinated plastic fuel tank is exposed to a scavenger to produce a scavenged plastic fuel tank and the scavenged plastic fuel tank is exposed to a third fluorination gas to produce the ultra-barrier plastic fuel tank. If (d)(I) occurs and (d)(III) does not, then the ultra-barrier plastic fuel tank is the scavenged plastic fuel tank. If (d)(I) does not occur and (d)(III) does occur, then the fluorinated plastic fuel tank is further exposed to a third fluorination gas to produce the ultra-barrier plastic fuel tank.

In some aspects, the optional scavenging step (d)(I) of method step (d) comprises the following steps: (d)(I)(i) feeding a scavenger to the chamber to a final scavenger partial pressure of at least 5 torr; (d)(I)(ii) exposing the fluorinated plastic fuel tank at the d(I)(i) final scavenger partial pressure for a time of at least 5 minutes to produce a scavenged plastic fuel tank; (d)(I)(iii) feeding nitrogen to the chamber to an absolute pressure ranging from 100 torr to 500 torr followed by pulling vacuum on the chamber to an absolute pressure less than 10 torr; and (d)(I)(iv) repeating step (d)(I)(iii) 1 to 6 times. In some aspects, the scavenger is selected from the group consisting of nitric oxide and triethyl amine. In some aspects, the step (d)(I)(i) final scavenger partial pressure ranges from 5 torr to 50 torr or from 5 torr to 30 torr. In some aspects, the step (d)(I)(ii) exposing time ranges from 5 minutes to 60 minutes or 5 minutes to 30 minutes. In some aspects, the step (d)(I)(i) final scavenger partial pressure ranges from 5 torr to 50 torr and the step (d)(I)(ii) exposing time ranges from 5 minutes to 60 minutes.

In some aspects, optional fluorination finishing step (d)(III) of method step (d) comprises the following steps: (d)(III)(i) ensuring the fluorinated plastic fuel tank or the scavenged plastic fuel tank is in the chamber and pulling vacuum on the chamber to an absolute pressure less than 10 torr; (d)(III)(ii) feeding nitrogen to the chamber to an absolute pressure ranging from 100 torr to 500 torr followed by pulling vacuum on the chamber to an absolute pressure less than 10 torr; (d)(III)(iii) repeating step (d)(III)(ii) at least once; (d)(III)(iv) feeding fluorination gas to the chamber to a final fluorine partial pressure of at least 10 torr; (d)(III)(v) exposing the fluorinated plastic fuel tank or the scavenged plastic fuel tank at the (d)(III)(iv) final fluorine partial pressure for a time of at least 5 minutes to produce an ultra-barrier plastic fuel tank; (d)(III)(vi) feeding nitrogen to the chamber to an absolute pressure ranging from 100 torr to 500 torr followed by pulling vacuum on the chamber to an absolute pressure less than 10 torr; and (d)(III)(vii) repeating step (d)(III)(vi) 1 to 6 times. In some aspects, the step (d)(III)(iv) final fluorine partial pressure ranges from 10 torr to 50 torr or from 10 torr to 30 torr. In some aspects, the step (d)(III)(v) exposing time ranges from 5 minutes to 60 minutes or 5 minutes to 30 minutes.

In some aspects the step (d)(II) time period ranges from 2 hours to 120 hours and step (d)(III) occurs. In some aspects, the step (d)(III)(iv) final fluorine partial pressure ranges from 10 torr to 50 torr and the step (d)(III)(v) exposing time ranges from 5 minutes to 30 minutes.

In some aspects, the steady-state flux (fuel loss) of the ultra-barrier plastic fuel tank subject to steps (a) through (d) is less than 0.25 gm/m$^2$/day as measured by SAE International Method J2665, "Test Procedure to Measure the Fuel Permeability of Materials by the Cup Weight Loss Method", using Fuel C at 40° C. In some aspects, the ultra-barrier fuel plastic tank subject to steps (a) through (d) loses less than 0.23 gm/m$^2$/day, less than 0.21 gm/m$^2$/day, less than 0.20 gm/m$^2$/day, or less than 0.19 gm/m$^2$/day.

According to yet another exemplary embodiment of the invention, an ultra-barrier plastic container produced by direct fluorination of a plastic container is provided. The direct fluorination of the plastic container comprises (a) providing a plastic container in a chamber, (b) providing an anaerobic and low moisture environment in the chamber, (c) providing at least one primary fluorination step of the plastic container to produce a fluorinated plastic container, and (d) providing a quenching step to the fluorinated plastic container to produce an ultra-barrier plastic container.

It is to be understood that the various aspects of the plastic container, the anaerobic and low moisture environment in the chamber, the at least one primary fluorination step of the plastic container to produce a fluorinated plastic container, and the quenching step to produce an ultra-barrier plastic container, the fluorination gas, the scavenging step, the fluorination finishing step, the measures of improvement in barrier properties imparted to the ultra-barrier containers described herein above apply to the present embodiment as well.

The size and shape of the ultra-barrier plastic container is not particularly limited so long as the plastic container can fit in the chamber. In one aspect, the ultra-barrier container ranges in size from 0.5 ml to 20,000 liters. Other non-limiting examples include ultra-barrier containers ranging in size from 0.5 ml to 10,000 liters, from 0.5 ml to 5,000 liters, from 0.5 ml to 2,500 liters, from 0.5 ml to 1,000 liters, from 0.5 ml to 500 liters, from 0.5 ml to 100 liters, from 0.5 ml to 50 liters, from 0.5 ml to 5 liters, from 0.5 ml to 1 liter, from 100 ml to 500 liters, from 100 ml to 100 liters, from 100 ml to 50 liters, from 100 ml to 10 liters, or from 100 ml to 5 liters.

In some aspects, a first steady-state weight loss of an organic solution from the ultra-barrier container is less than 60 percent of a second steady-state weight loss of the organic solution from a substantially similar barrier plastic container, as measured using ASTMD2684-10 at 50° C. In some aspects, the first steady-state weight loss is less than 55 percent, less than 50 weight percent, less than 45 weight percent, less than 40 weight percent, or less than 35 weight percent of the second steady-state weight loss.

In some aspects, the ultra-barrier plastic container is a plastic fuel tank ranging in size from 0.5 ml to 20,000 liters. In some aspects, the plastic fuel tank is fluidly connectable to a riding mower, a push mower, a leaf blower, a snow blower, a grass trimmer, a pressure washer, or a generator. In some aspects, the plastic fuel tank is fluidly connectable to a motorcycle, an all-terrain vehicle, a car, a truck, a boat, or a plane.

In some aspects, the container size ranges from 0.5 ml to 1 liter and the organic solution comprises cosmetics and/or fragrances. In some aspects, the container size ranges from 100 ml to 5 liters and the organic solution comprises cleaners. In some aspects, the container size ranges from 100 ml to 5 liters and the organic solution comprises solvents. In some aspects, the container size ranges from 100 ml to 500 liters and the organic solution comprises agricultural chemicals. In some aspects, the container size ranges from 100 ml to 5 liters and the organic solution comprises fuel.

EXAMPLES

High density polyethylene (HDPE) containers were commercially available and used without any further processing prior to the DuroBloc Process™ (Comparative Example 1) and the inventive fluorination process (Example 1). Nitric oxide UHP grade was purchased from Matheson (Irving, Tex.)

Comparative Example 1

A commercially available DuroBloc Process™ treated high density polyethylene (HDPE) f-style, quart container, available from Inhance Technologies LLC, (Houston, Tex.), was used for Comparative Example 1. The Fourier Transform Infrared Spectroscopy (FTIR) graph of a sample of the Comparative Example 1 container is shown in FIG. 1.

Example 1

An HDPE f-style, quart container was inserted into a chamber. The purging step included the following actions. Air was evacuated from the chamber by pulling vacuum until the pressure was 6 torr. Nitrogen was then added to the chamber until the pressure was 400 torr. Vacuum was again pulled on the chamber until the pressure was 6 torr. The nitrogen fill to 400 torr and vacuum to 6 torr was repeated. Pure fluorine gas was added to the chamber to a partial pressure of 10 torr (total chamber pressure of 16 torr). The fluorine gas was held in the chamber for 5 minutes before vacuum was again pulled to 6 torr. Nitrogen was again added to a pressure of 250 torr followed by pulling vacuum to 6 torr.

The fluorination step included the following actions. Flow of elemental fluorine gas was introduced in short intervals every two minutes such that the partial pressure of fluorine gas increased by 2 torr. The gas flow occurred every two minutes over a period of 70 minutes until the partial pressure of the fluorine gas was 70 torr. 210 minutes passed with no further action. Then vacuum was pulled until the pressure was 6 torr. Again, fluorine gas was fed into the chamber every two minutes over a period of 70 minutes to a partial pressure of the fluorine gas was 70 torr. Again, 210 minutes passed with no further action until vacuum was pulled to 6 torr. Nitrogen was added until the pressure was 400 torr and then vacuum was again pulled to 6 torr. The nitrogen addition and vacuum cycle was repeated twice for a total of three cycles.

The quenching step included the following actions. The chamber was charged with 25 torr nitric oxide and held for 10 minutes before vacuum was pulled to 6 torr. Nitrogen was added until the pressure was 400 torr and then vacuum was again pulled to 6 torr, with the nitrogen addition and vacuum cycle repeated a total of three times. The chamber was returned to atmospheric conditions and the HDPE container was removed. The container was allowed to sit in atmosphere for 96 hours. The container was them returned to the chamber. Vacuum was pulled on the chamber until a pressure of 6 torr was reached. Nitrogen was added until the pressure was 400 torr and then vacuum was again pulled to 6 torr, with the nitrogen addition and vacuum cycle repeated a total of three times. Fluorine gas was charged to the reactor to a partial pressure of 30 torr. After 30 minutes, vacuum was pulled until the chamber reached 6 torr. Nitrogen was added until the pressure was 400 torr and then vacuum was again pulled to 6 torr, with the nitrogen addition and vacuum cycle repeated a total of three times. The chamber was returned to atmospheric conditions and the container was removed. The Fourier Transform Infrared Spectroscopy (FTIR) graph of a sample of the Example 1 container is shown in FIG. 2

Figure 2:
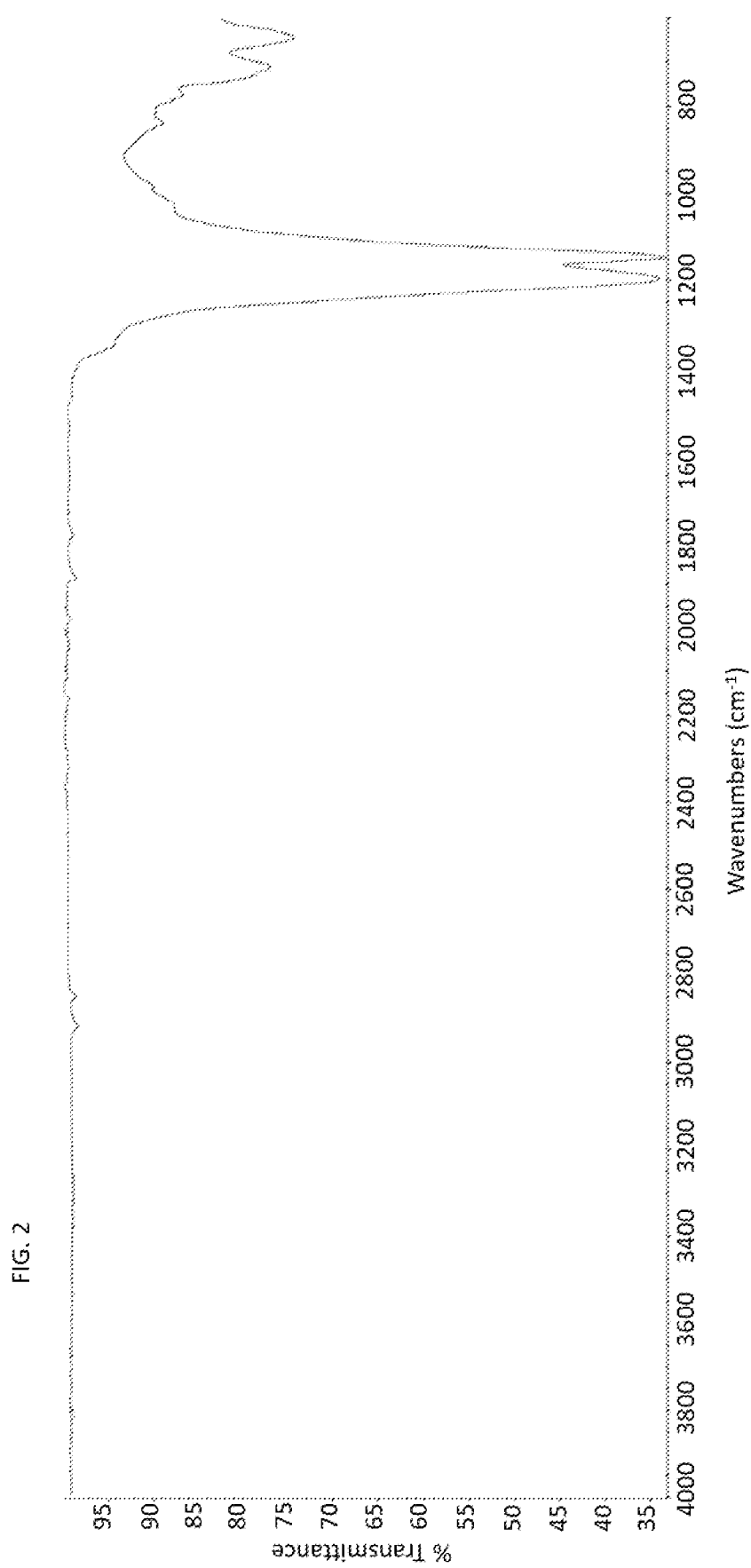
FIG. 2 represents the Fourier Transform Infrared Spectroscopy (FTIR) graph for Example 1.

Comparing the FTIR graph of FIG. 1 and FIG. 2 shows the decrease in the number of carbon-oxygen bonds moieties (which are an indication of chain terminations) between Comparative Example 1 and inventive Example 1.

Containers from Comparative Example 1 and Example 1 were filled with toluene and stored at 50° C. for 28 days, per ASTM D2684-10. The containers were weighed three times each week. Typically, the weight loss reached a steady state value around 21 days of 0.240% weight loss/m$^2$/day for Comparative Example 1 and 0.104% weight loss/m$^2$/day for Example 1. Using 0.087163 m$^2$/bottle for the surface area of the f-style quart container and 867 kg/m$^3$ for the density of toluene, the steady state toluene weight loss at 28 days for each container is given in Table 1.

TABLE 1

| Example | Toluene steady-state weight loss (% weight loss/m$^2$/day) |
| --- | --- |
| Comparative Example 1 | 0.240% |
| Example 1 | 0.104% |

The improved process of Example 1 showed only 43% of the steady-state toluene weight loss shown by Comparative Example 1.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method of direct fluorination of a plastic container comprising:
   (a) providing a plastic container in a chamber;
   (b) providing an anaerobic and low moisture environment in the chamber;
   (c) providing at least one primary fluorination step of the plastic container to produce a fluorinated plastic container;
   (d) providing a quenching step to the fluorinated plastic container to produce an ultra-barrier plastic container; and
   wherein the step (b) providing the anaerobic and low moisture environment comprises:
   (b)(I) pulling vacuum on the chamber to an absolute pressure less than 10 torr;
   (b)(II) feeding nitrogen to the chamber to an absolute pressure ranging from 100 torr to 500 torr followed by pulling vacuum on the chamber to an absolute pressure less than 10 torr;
   (b)(III) optionally repeating steps b(I) and b(II) at least once;
   (b)(IV) feeding a first fluorination gas to the chamber to a fluorine partial pressure ranging from 5 torr to 20 torr;
   (b)(V) ceasing any inflow and/or outflow from the chamber for a time ranging from 0 minutes to 20 minutes;
   (b)(VI) pulling vacuum on the chamber to an absolute pressure less than 10 torr; and
   (b)(VII) optionally feeding nitrogen to the chamber to an absolute pressure ranging from 100 torr to 500 torr followed by pulling vacuum on the chamber to an absolute pressure less than 10 torr, and repeating the feeding nitrogen followed by the pulling vacuum 0 to 6 times.

2. The method of claim 1, wherein the plastic container comprises polyethylene, polypropylene, thermosets, and/or copolymers thereof.

3. The method of claim 1, wherein the step (c) providing the at least one primary fluorination step to the plastic container to produce the fluorinated plastic container comprises:
   (c)(I) feeding a second fluorination gas to the chamber at a rate whereby a fluorine partial pressure increases in a range from 0.5 torr/min to 5.0 torr/min providing a final fluorine partial pressure ranging from 20 torr to 200 torr;
   (c)(II) exposing the plastic container to the second fluorination gas at the (c)(I) final fluorine partial pressure for a time of at least 30 minutes;
   (c)(III) pulling vacuum on the chamber to an absolute pressure less than 10 torr;
   (c)(IV) repeating steps (c)(I) to (c)(III) 0 to 3 times; and
   (c)(V) optionally feeding nitrogen to the chamber to an absolute pressure ranging from 100 torr to 500 torr followed by pulling vacuum on the chamber to an absolute pressure less than 10 torr, and repeating the feeding nitrogen followed by the pulling vacuum 0 to 6 times.

4. The method of claim 3, wherein the second fluorination gas comprises from 1 vol % to 100 vol % fluorine.

5. The method of claim 4, wherein the step(c)(I) fluorine partial pressure increases in a range from 0.5 torr/min to 3.0 torr/min and the step(c)(I) final fluorine partial pressure ranges from 30 torr to 150 torr, and wherein the step (c)(II) exposing time ranges from 30 minutes to 600 minutes.

6. The method of claim 1, wherein the step (d) providing the quenching step comprises:
   (d)(I) optionally, a scavenging step comprising:
      (d)(I)(i) feeding a scavenger to the chamber to a final scavenger partial pressure of at least 5 torr;
      (d)(I)(ii) exposing the fluorinated plastic container to the scavenger at the (d)(I)(i) final scavenger partial pressure for a time of at least 5 minutes to produce a scavenged plastic container;

(d)(I)(iii) feeding nitrogen to the chamber to an absolute pressure ranging from 100 torr to 500 torr followed by pulling vacuum on the chamber to an absolute pressure less than 10 torr; and (d)(I)(iv) repeating step (d)(I)(iii) 1 to 6 times;

(d)(II) returning the chamber to atmospheric conditions and exposing the fluorinated plastic container or the scavenged plastic container to the atmosphere for a time period of at least 2 hours; and (d)(III) optionally, a fluorination finishing step comprising:

(d)(III)(i) ensuring the fluorinated plastic container or the scavenged plastic container is in the chamber and pulling vacuum on the chamber to an absolute pressure less than 10 torr;

(d)(III)(ii) feeding nitrogen to the chamber to an absolute pressure ranging from 100 torr to 500 torr followed by pulling vacuum on the chamber to an absolute pressure less than 10 torr;

(d)(III)(iii) optionally, repeating step (d)(III)(ii) at least once;

(d)(III)(iv) feeding a third fluorination gas to the chamber to a final fluorine partial pressure of at least 10 torr;

(d)(III)(v) exposing the fluorinated plastic container or the scavenged plastic container to the third fluorination gas at the (d)(III)(iv) final fluorine partial pressure for a time of at least 5 minutes to produce an ultra-barrier plastic container;

(d)(III)(vi) feeding nitrogen to the chamber to an absolute pressure ranging from 100 torr to 500 torr followed by pulling vacuum on the chamber to an absolute pressure less than 10 torr; and (d)(III)(vii) repeating step (d)(III)(vi) 1 to 6 times, wherein at least one of the steps (d)(I) and (d)(III) occurs, and wherein when the step (d)(III) does not occur, the ultra-barrier plastic container is the scavenged plastic container.

7. The method of claim 6, wherein the scavenger is selected from the group consisting of nitric oxide and/or triethyl amine.

8. The method of claim 6, wherein the step (d)(I)(i) final scavenger partial pressure ranges from 5 torr to 50 torr and the step (d)(I)(ii) exposing time ranges from 5 minutes to 60 minutes.

9. The method of claim 6, wherein the step (d)(II) time period ranges from 2 hours to 120 hours and the step (d)(III) occurs, and wherein the step (d)(III)(iv) final fluorine partial pressure ranges from 10 torr to 50 torr and the step (d)(III)(v) exposing time ranges from 5 minutes to 30 minutes.

10. The method of claim 1, wherein a first steady-state weight loss of an organic solution from the ultra-barrier container is less than 60 percent of a second steady-state weight loss of the organic solution from a substantially similar barrier plastic container, as measured using ASTM D2684-10 at 50° C.

11. The method of claim 10, wherein the organic solution comprises agricultural chemicals, fuel, fuel additives, cleaners, degreasers, solvents, acetone, d-limonene, terpenes, fragrances, and/or essential oils.

12. The method of claim 10, wherein the organic solution is selected from the group consisting of 1,1,1-trichloroethane, xylene, naphtha, toluene, mineral spirits, carbon tetrachloride, and/or turpentine and wherein the first steady-state weight loss is less than 50 percent of the second steady-state weight loss.

13. The method of claim 1, wherein a steady-state weight loss of toluene from a standard 32 oz f-style plastic HDPE bottle subject to steps (a) through (d) is less than 1.4 $gm/m^2/day$, wherein the steady-state weight loss is measured using ASTMD2684-10 at 50° C.

14. A method of direct fluorination of a plastic fuel tank comprising:

(a) providing a plastic fuel tank in a chamber;

(b) providing an anaerobic and low moisture environment in the chamber;

(c) providing at least one primary fluorination step of the plastic fuel tank to produce a fluorinated plastic fuel tank; and (d) providing a quenching step to the fluorinated plastic fuel tank to produce an ultra-barrier plastic fuel tank, wherein the step (b) providing the anaerobic and low moisture environment comprises:

(b)(I) pulling vacuum on the chamber to an absolute pressure less than 10 torr;

(b)(II) feeding nitrogen to the chamber to an absolute pressure ranging from 100 torr to 500 torr followed by pulling vacuum on the chamber to an absolute pressure less than 10 torr;

(b)(III) optionally repeating steps b(I) and b(II) at least once;

(b)(IV) feeding a first fluorination gas to the chamber to a final fluorine partial pressure ranging from 5 torr to 20 torr;

(b)(V) ceasing any inflow or outflow from the chamber for a time ranging from 0 minutes to 20 minutes;

(b)(VI) pulling vacuum on the chamber to an absolute pressure less than 10 torr; and (b)(VII) optionally feeding nitrogen to the chamber to an absolute pressure ranging from 100 torr to 500 torr followed by pulling vacuum on the chamber to an absolute pressure less than 10 torr, and repeating the feeding nitrogen followed by the pulling vacuum 0 to 6 times.

15. The method of claim 14, wherein the step (c) providing the at least one primary fluorination step to the plastic fuel tank to produce a fluorinated plastic fuel tank comprises:

(c)(I) feeding a second fluorination gas to the chamber at a rate whereby a fluorine partial pressure increases in a range from 0.5 torr/min to 5.0 torr/min providing a final fluorine partial pressure ranging from 20 torr to 200 torr;

(c)(II) exposing the plastic fuel tank to the second fluorination gas at the (c)(I) final fluorine partial pressure for a time range of 30 minutes to 600 minutes;

(c)(III) pulling vacuum on the chamber to an absolute pressure less than 10 torr;

(c)(IV) repeating steps (c)(I) to (c)(III) 0 to 3 times; and (c)(V) optionally feeding nitrogen to the chamber to an absolute pressure ranging from 100 torr to 500 torr followed by pulling vacuum on the chamber to an absolute pressure less than 10 torr, and repeating the feeding nitrogen followed by the pulling vacuum 0 to 6 times.

16. The method of claim 15, wherein the step (d) providing the quenching step comprises:
- (d)(I) optionally, a scavenging step comprising:
  - (d)(I)(i) feeding a scavenger to the chamber to a final scavenger partial pressure of at least 5 torr;
  - (d)(I)(ii) exposing the fluorinated plastic fuel tank to the scavenger at the (d)(I)(i) final scavenger partial pressure for a time of at least 5 minutes to produce a scavenged plastic fuel tank;
  - (d)(I)(iii) feeding nitrogen to the chamber to an absolute pressure ranging from 100 torr to 500 torr followed by pulling vacuum on the chamber to an absolute pressure less than 10 torr; and
  - (d)(I)(iv) repeating step (d)(I)(iii) 1 to 6 times;
- (d)(II) returning the chamber to atmospheric conditions and exposing the fluorinated plastic fuel tank or the scavenged plastic fuel tank to the atmosphere for a time period of at least 2 hours; and
- (d)(III) optionally, a fluorination finishing step comprising:
  - (d)(III)(i) ensuring the fluorinated plastic fuel tank or the scavenged plastic fuel tank is in the chamber and pulling vacuum on the chamber to an absolute pressure less than 10 torr;
  - (d)(III)(ii) feeding nitrogen to the chamber to an absolute pressure ranging from 100 torr to 500 torr followed by pulling vacuum on the chamber to an absolute pressure less than 10 torr;
  - (d)(III)(iii) repeating step (d)(III)(ii) at least once;
  - (d)(III)(iv) feeding a third fluorination gas to the chamber to a final fluorine partial pressure of at least 10 torr;
  - (d)(III)(v) exposing the fluorinated plastic fuel tank or the scavenged plastic fuel tank to the third fluorination gas at the (d)(III)(iv) final fluorine partial pressure for a time of at least 5 minutes to produce an ultra-barrier plastic fuel tank;
  - (d)(III)(vi) feeding nitrogen to the chamber to an absolute pressure ranging from 100 torr to 500 torr followed by pulling vacuum on the chamber to an absolute pressure less than 10 torr; and
  - (d)(III)(vii) repeating step (d)(III)(vi) 1 to 6 times, wherein at least one of the steps (d)(I) and (d)(III) occur, and wherein when the step (d)(III) does not occur, the ultra-barrier plastic fuel tank is the scavenger plastic fuel tank.

* * * * *